United States Patent [19]
Ramond

[11] 3,720,989
[45] March 20, 1973

[54] GEAR CUTTING METHODS

[75] Inventor: Pierre A. Ramond, Billancourt, France

[73] Assignee: Regie Nationale des Usines Renault, Billancourt, France

[22] Filed: May 25, 1970

[21] Appl. No.: 39,969

[52] U.S. Cl. ................................................. 29/159.2
[51] Int. Cl. ....... B21d 53/28, B21h 5/00, B21k 1/30, B23p 15/14, B29d
[58] Field of Search ................ 29/159, 159.2; 90/4, 8

[56] References Cited

UNITED STATES PATENTS

| | | | |
|---|---|---|---|
| 2,788,567 | 4/1957 | Stibitz | 29/159.2 X |
| 3,504,565 | 4/1970 | Lichtenauer et al. | 29/159.2 X |
| 3,605,467 | 9/1971 | White et al. | 29/159.2 X |

*Primary Examiner*—Charles W. Lanham
*Assistant Examiner*—Victor A. DiPalma
*Attorney*—Stevens, Davis, Miller & Mosher

[57] ABSTRACT

Method of manufacturing teeth, notably of gearings having their outline cut integrally by means of a pinion-tool, wherein an apparent outline of theoretical pinion-tool for different states of wear of said tool is calculated from the outline of the desired workpieces and of its generating rack ; from the surfaces of the teeth of the theoretical pinion-tool a theoretical hob is calculated for generating said surfaces ; a simplified hob is then made from said theoretical hob, and used for milling pinion-tools adapted to produce rough-cut gears after sharpening the leading faces of said pinion-tools ; the outlines of these gears are then compared with the desired outline for any possible correction of the simplified hob outline and the resultant correction of the pinion-tools and workpieces ; this method is applicable to the cutting of spur or helical teeth, whether of the involute type or not, for both internally toothed and externally toothed gears, by using milled pinion-tools.

11 Claims, 40 Drawing Figures

$$tg\,\hat{B}_r = \frac{tg\,\hat{B}}{\cos \hat{C}}$$
$$\hat{B}_r > \hat{B}$$

*Fig. 13*

$$P_n = P_t \cdot \cos \hat{R}_r$$

*Fig. 14*

$$tg\,\hat{I} = \frac{tg(\hat{R}_r - f)}{\cos \hat{C}}$$
$$tg\,f = \frac{P_x}{2\pi R} = \frac{P_n}{2\pi \cos f}$$
$$\sin f = \frac{P_n}{2\pi R}$$

Fig. 22c $$tg\, S \# \frac{R_n - R_{n+1} \cdot \cos \hat{R}}{dh}$$

GEAR CUTTING METHODS

The present invention relates to the manufacture of teeth by cutting and more particularly to a method of cutting gear teeth by means of pinion-tools, i.e. pinion-shaped cutters, the method of this invention concerning likewise, from the initial choice of the desired tooth outline, the obtaining of a corresponding tool outline, the determination of the characteristics of the corresponding hob necessary for milling these pinion-shaped cutters and the manufacture of gears by using these means.

It is known that all presently known gear teeth comprise a relatively considerable bottom clearance, as a rule greater than one-fourth of the diametral pitch or module (ratio of pitch circle diameter to teeth number), this clearance being necessary on account on the one hand of the machining tolerances inherent to cutting machines and on the other hand and more particularly of variations in the outlines of the teeth of the cutting tools, as a consequence of wear and of the necessary sharpening operations. The teeth bottoms of the pinion-shaped tools proper are cut with a view to form only a simple bevel on the edges of the tips of the cut teeth, and the milling operation carried out on these tools must compulsorily be followed by a grinding operation. Consequently, this necessity of forming a relatively considerable bottom clearance in the gear teeth, in order to avoid any risk of interference during actual service, constitutes an important factor in the calculation of gear cutting cost, on the one hand, and a primary cause of weakening of gear teeth strength, on the other hand.

It is the essential object of the present invention to provide a method of cutting gear teeth by means of a pinion-tool(pinion-shaped tool) the primary feature characterizing this method being that the top and bottom outlines of the teeth remain constant irrespective of the degree of tool wear, the only manufacturing tolerances being those required for the cutting operation proper, i.e., those due to the possible constructional inaccuracy of the kinematic chain of the machine.

This method consists in determining the outline of the workpiece to be obtained as a function of a generating rack and then calculating an apparent outline of the theoretical pinion-shaped tool corresponding to the workpiece outline determined by the different wearing conditions of this pinion-shaped tool, and subsequently calculating from the thus obtained pinion-tool teeth surfaces a theoretical hob for generating these surfaces. A hob simplified as a function of the production means is then made from the theoretical hob. This simplified hob is then used for cutting simplified pinion-tools for eventually producing the gears. Should these gears prove to be outside the range of permissible tolerances with respect to the desired outline, after a proper comparison therebetween, the necessary corrections will be brought to the outline of the hob in order to correct the pinion-tool and therefore the workpiece.

In contrast to conventional gear cutting processes utilizing pinion-tools, the cutting method of this invention cuts the teeth not only along their side faces but also their bottom and top surfaces. It is a characteristic feature of this invention that the pinion-tools are sharpened by means of grinding wheels having the shape of opposed double frustums of cones assembled by their major bases, thus ensuring a direct elimination of the connecting "steps" inherent to the sharpening operations carried out by means of cylindrical grinding wheels which are a source of irregular shapes and incipient ruptures at the top of the teeth in the case of workpieces and at the bottom of the teeth in the case of the pinion-tools.

With the method of manufacturing teeth according to this invention the teeth are formed integrally by milling, including their tops and bottoms, within tolerances consistent with their direct utilization. Only a finishing rolling and gauging operation constituting on the other hand the subjectmatter of a separate patent application by the same Applicants is required for obtaining an adequate surface condition and a surface reinforcement of the active teeth outlines.

The method of this invention is applicable to the cutting of spur or helical gears, whether of the involute type or not, whether internally-toothed or externally-toothed type, by using pinion-shaped tools obtained directly from the milling operation, the only grinding operation being the sharpening operation according to the method of this invention.

The additional cost for previously making a hob having a specific teeth outline as required for making the pinion-tool is amply compensated by the following advantageous economical features:

The pinion-tools are of the "integral" toothed type adapted to be used immediately after completing the milling operation, without any further grinding, notably of the teeth bottoms;

The number of permissible re-sharpening operations that can be performed on these pinion-tools is increased, due to the corrected-outline cutting thereof;

The resulting workpieces have a constant teeth outline insensitive to tool wear and to the corresponding reduction in the teeth clearance or bottom clearance;

Hitherto conventional finishing operations such as shaving are replaced by a cold rolling and gauging operation which is more efficient and economical.

Finally, the reduction of the bottom clearance, now made possible due to the increased cutting precision, leads to a reinforcement of the teeth as a consequence of the reduction in the total depth. This reinforcement may lead, given an equal effort or torque, to a dimensional reduction of the gears or, given equivalent dimensions, to an increased gear performance.

The manner in which the method may be carried out will appear more clearly as the following description proceeds with reference to the attached drawing, in which:

FIGS. 22a, 22b, 22c, and 22d illustrate the outline position parameters;

FIG. 26 completing FIG. 20 shows the parameters for calculating a conjugate outline of cutting edge for a given state of wear at a position $t_R$;

Figure 1:
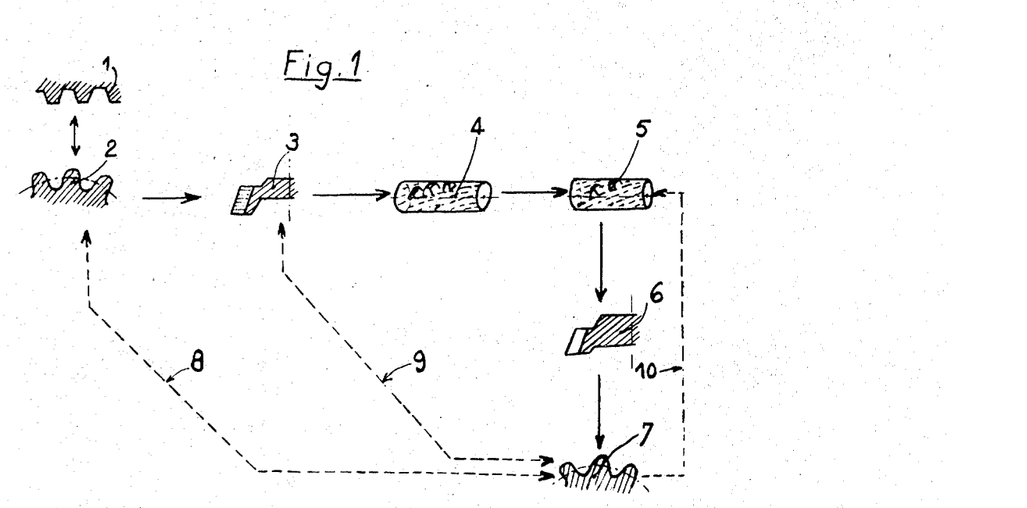
FIG. 1 is a general diagram summarizing the various steps of the method of this invention.

Referring first to the diagram of FIG. 1, the outlines 1 and 2 are those of the rack and of the workpiece, constituting a preliminary step and leading to the calculated theoretical pinion-tool 3 and then to the calculated theoretical hob 4 from which the simplified hob 5 is obtained which leads to the simplified pinion-tool 6 and then to the resultant pinion 7 from which comparisons 8 and 9 and a corrective action 10 may be exerted on the original workpiece 2, the pinion-tool 3 or the hob 5.

Figure 2:
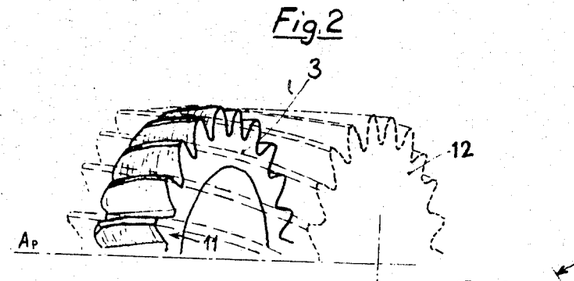
FIG. 2 is a perspective view showing a pinion-tool according to the method of this invention and the equivalent envelope pinion of the state of wear.

FIG. 2 illustrates a theoretical pinion referred to as the "equivalent pinion" 12, i.e. equivalent to the tool 3 for a certain state or degree of wear (and has leading faces 11) characterized by the center distance between the workpiece and the tool.

The equivalent pinion is the conjugate pinion of the workpiece for this distance between centers. Its apparent outline is the conjugate outline of the workpiece outline.

The thread of this equivalent pinion carries the cutting edge corresponding to the aforesaid degree or state of wear.

During the cutting operation proper, each state or degree of wear contemplated for sharpening the tool admits an equivalent pinion enveloping the cutting edge outline of the tooth on the leading face of the tooth which is perpendicular to the helical surface of the side faces.

To each degree of wear there corresponds a center distance between the pinion and the pinion-tool.

The states of wear are determined by:
the choice of the number of teeth of the pinion-tool;
the calculation of the apparent outlines of the equivalent pinions for the different distances between centers;
the deduction of the real outlines of the cutting edges;
the choice of a reference state for calculating the various characteristics.

The initial data in the examples of practical calculations given hereinafter relate to a helical gear of any desired outline, determined by points. Only the basic elements of these calculations are given, the material execution of these calculations, which may be performed by using known machines, being not in direct relationship with the subjectmatter of this invention.

The initial data include:
a point which, in the selected reference system, is determined by its co-ordinates $x, y, z$;
a normal $n$ at this point;
a radius of curvature $R$;
a nominal pitch circle having a diameter $d_o$ (and radius $r_o$), a nominal diametral pitch (module) $mt_o$ and a nominal helix angle $\hat{B}_o$, for a teeth number $Z_1$.

The nominal pitch circle is so selected that the addendum is equal to the dedendum, i.e.: $h_{ao} = hF_o$.

In the following disclosure and in the diagrams, the reference numerals and indicia 1, 2 and 3 designate the workpiece, pinion-tool and hob, respectively.

These data are sufficient for calculating by points the conjugate outline of any desired tooth outline in a parallel-axes generation.

Let us revert to the calculation of the outlines of the various states of wear:

The number of teeth $Z_2$ will be selected as a function of the standard diameters of the pinion-tools and also of the limitation as to distances between centers which can be afforded in the machine tool contemplated.

The final choice will be made by avoiding tolerances in the workpiece to pinion-tool generation, with a workpiece having a nominal pitch circle equal to the operating pitch circle ($r_o = r^1{}_1$) and a pinion-tool denoted $Z_2$ of which the pitch circle has a radius $r^1{}_2 = (Z_2/Z_1)r^1{}_1$; therefore, $Z_2 = Z_1(r^1{}_1/r^1{}_2)$, with $a = r^1{}_1 + r^1{}_2$, i.e. the distance between centers for an equivalent gear, therefore a given state of wear.

The choice of the series of distances between centers or center distances is limited by the maximum and minimum mounting center distances: $a^1{}_1 \ldots a^1{}_j \ldots a^1{}_{x^o}$ To the series of selected distances between centers and for a distance between centers $a^1{}_j = r^1{}_{1j} + r^1{}_{2j}$ such that $(r^1{}_{1j}/r^1{}_{2j}) = Z_1/Z_2$ and such that $m^1{}_j = (2r^1{}_{1j}/Z_1) = (2r^1{}_{2j}/Z_2)$, there will correspond an apparent outline ($j^1$) of the equivalent pinion in the state of wear ($j$) of the pinion-tool (the pinion and equivalent pinion being parallel).

The outlines ($j$) are calculated up to the worn condition, the center distance $a^1{}_j$ decreasing gradually, the outline in the worn state meeting on the one hand the non-interference requirements and on the other hand limitation requirements due to the active dedendum diameter. They are subsequently calculated up to the "new" outline, the latter being limited by the thickness of the top of the tooth.

Thus, a series of apparent outlines, defined by points, and each associated with a distance between centers:

| $a^1_u$ | $a^1_j$ | $a^1_n$ |
|---|---|---|
| (Outline in worn condition) | (Outline j) | (Outline of new workpiece) | is obtained.

Figure 3A:
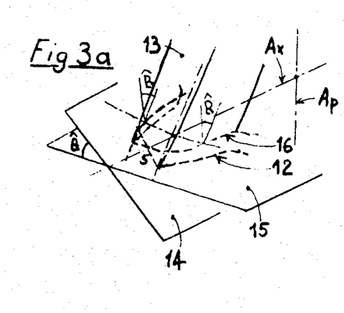
FIG. 3a, 3b and 3c illustrate diagrammatically the geometrical positions of the apparent plane, of the real plane and of the sharpening plane of a tooth outline of the pinion-tool together with the calculation elements.

The real outlines of the cutting edges are calculated on the following bases :

the apparent outline $j'$ admits an axis of symmetry $A_x$ for a tooth passing through the axis $A_p$ of the pinion-tool (FIG. 3a).

Bearing on this outline is the thread of the equivalent pinion characterized by a helix angle $\hat{B}$ on the operating cylinder.

Figure 3B:
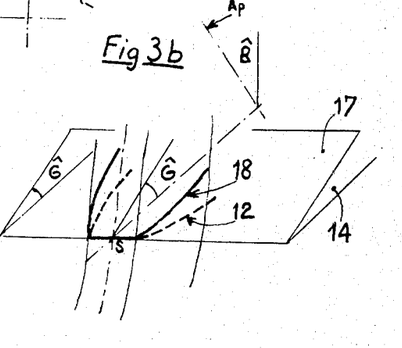

A first intermediate outline 12 as shown in FIG. 3 is obtained, which is the intersection of thread 13 with a real intermediate plane 14 forming an angle $\hat{B}$ with the apparent plane 15 containing the apparent outline 16.

Choice of a sharpening angle $\hat{G}$.

The intersection of the thread with a real sharpening plane 17 forming an angle $\hat{G}$ with the real intermediate plane 14 gives the eventual real outline 18.

The helix angle for the intermediate outline corresponds to the helix angle of the operating cylinder. As a result, a different inclination is obtained for each sharpening condition or state.

For a given or reference state the latter will have an operating distance between centers: $a^1 = (a^1u + a^1n)/2$ with the pinion.

The point by point calculation of the cutting edge will be made from the following data :
  apparent outline by points ;
  equivalent pinion ;
  helices of the cylindrical thread.

Figure 3C:
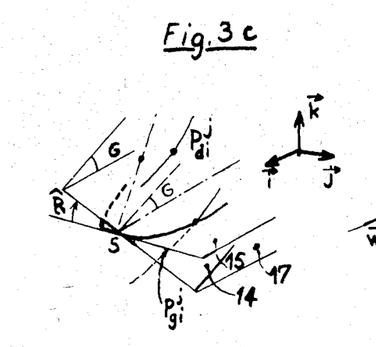

In a referencial state associated with the pinion-tool, the cutting edge will be calculated by points, according to the data shown in FIG. 3c. Each point P represents the intersection of the cylindrical helix passing through a point of the apparent outline with the plane $P_r$ or real plane 14, deduced from $Pa$, or apparent plane 15, by two rotations $\hat{B}$, $\hat{G}$ according to FIG. 3c.

The reference state is selected as a function of characteristics giving a constant pitch to the rack intended for milling the pinion-tool.

This reference state is determined from :
  its distance between centers $a^1 = r^1_1 + r^1_2$ ($a^1 = (a'u + a'h)/2$)
  the number of teeth $Z_2$ ;
  the operating helix angle $\hat{B}^1$ on the operating cylinder of radius $r^1_2$ ;
  the axial pitch of the cylindrical helix $Px = (2\pi r'2)/(tgB')$
  the apparent outline, obtained by points.

Then the rack of this apparent outline in the reference state is calculated.

Let S be the tooth thickness or chordal thickness on the pitch line, $e$ the distance between adjacent teeth on this line, $a$ the addendum value and $f$ the dedendum value. The rack will be characterized by the absence of interference and a tooth top thickness slightly different from the gap between adjacent teeth roots or bases ($Sa \neq ef$).

If, after having calculated by points the generating rack, these requirements are not met, the calculation is resumed with different characteristics (new radius of cutting operation).

The optimum rack is eventually found ; then $Sa$ and $ef$ are carried on lines spaced by a distance $m_t$ from the pitch line (with $m_t = (2r_2/Z_2)$ ) and the apparent pitch of this rack is determined as follows : $P_t = \pi m_t = (2\pi r_2)/Z_2$. This rack is characterized by its reference line or line of equal dimension for which $S = o$, its constant halfpitch being $P_t/2 = \pi r2/Z_2$.

Having thus defined the outline of the states of wear of the tool, their relative position remains to be found.

These states of wear are positioned as a function of the kinematic elements of the milling machine which, for the pinion-tool, are its rotation $\vec{W_2}$ and its radial feed $\vec{V_r}$ and for the hob its rotation $\vec{W_3}$, its axial feed $\vec{V_x}$ and the possibility of inclining the milling cutter.

Figure 4:
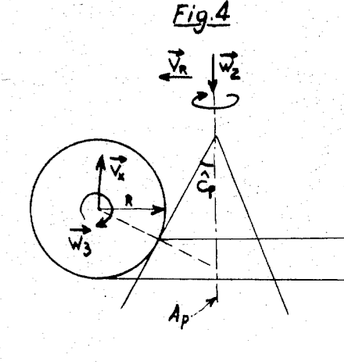
FIGS. 4 and 5 are diagrammatical views of the kinematic elements of the tool milling machine.
Figure 5:
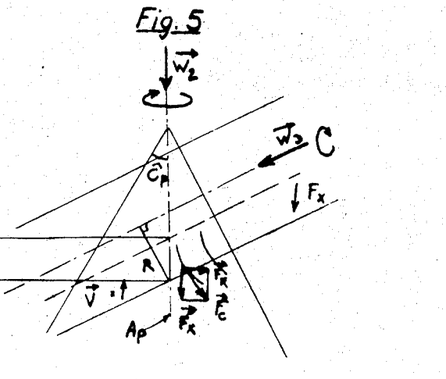

During the generation, the hub characterized by a reference cylinder moves tangentially to a cone inherent to the pinion-tool (FIG. 4).

Thus, the machining operation takes place orthogonally to the tangent plane common to the reference cylinder and to the kinematic cone having a vertex angle $\hat{C}$, such that $$tg\hat{C} = \frac{|\vec{V_r}|}{|\vec{V_x}|}$$

As the hob must have a constant pitch on a certain cylinder, this cylinder will be the reference cylinder already described in the foregoing, wherein the normal half-pitch is constant, and subtracted from the previously calculated apparent pitch, with due consideration for the preselected cone angle, together with the radius of this cylinder.

Thus, two helices having a mutual spacing of half the normal pitch and corresponding to the selected one-thread hob, are obtained on this cylinder.

During the hob to pinion-tool movement these two helices describe two surfaces.

On each side face of a tooth of the pinion-tool there is one point admitting a conjugate point on the homologue helix of said side face.

The surfaces described by the two helices, which surfaces are denoted by a reference related to the pinion-tool, must bear on the homologue side faces of one tooth of the state of wear.

Simultaneously, the left-hand side face must be tangent to the surface generated by the homologue helix, the right-hand side face must be tangent to the other surface (in this respect it may be noted that there is a great likelihood that the conjugation or "pairing" for each side face does not occur simultaneously).

In this case, the cone-to-cylinder positioning being determined at a time O, there are two positioning parameters for each state :
  one in vertical translation,
  one in rotation about the axis of the pinion-tool.

Having thus determined the kinematic elements, and positioned the states of wear, the lateral and front clearances will derive therefrom.

In the calculation of the necessary data, the vertex angle $\hat{C}$ of the kinematic cone is an initial choice. The angle $\hat{C}$ is selected in accordance with the experience acquired with conventional pinion-tools.

This angle may be modified if the lateral clearances obtained therewith are not satisfactory. In this case, the calculations must be made again according to FIG. 10 wherein $h_d$ denotes the homologue helix of the right-hand side face $f_d$, and $h_g$ the homologue helix of the left-hand side face $f_g$, such as defined by the position of the pinion-tool 3 in this Figure.

Figure 6:
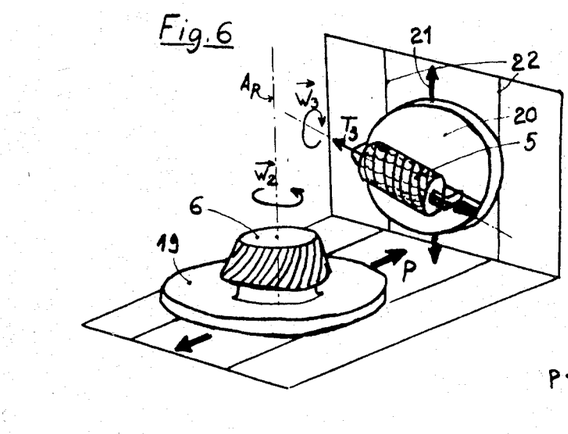
FIG. 6 is a perspective diagram of this machine.

These kinematic elements lead to utilizing a machine of the type shown diagrammatically in FIG. 6, wherein the pinion-tool 6 to be machined, mounted on a supporting or work table 19, is rotated as shown at a speed $\vec{W_2}$ with an operative feed $p$.

The hob 5 driven at a speed $\vec{W_3}$ is mounted on a hob-supporting headstock 20 to which a vertical movement of translation 21 is impressed along the slideways 22 of the hob headstock.

Moreover, the hob 5 receives a continuous axial movement of translation $T_3$ whereby, during the machining operation, the variable geometry of the hob can be brought into effect.

Figure 7:
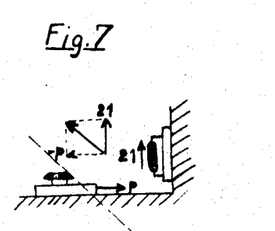
FIGS. 7 and 8 illustrate the combined feed movements.
Figure 8:
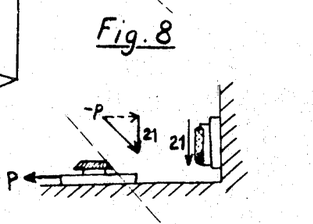

Thus, a combination between the axial feed 21 of the hob, its rotation $\vec{W_3}$ and the rotation $\vec{W_2}$ of the pinion tool-supporting table 20, which are known per se, on the one hand, and the radial-feed movement of translation $p$ of the pinion-tool supporting table 19 (FIG. 6) and the continuous axial translation $T_3$ of the hob, on the other hand, is obtained. FIGS. 7 and 8 illustrate the possible compositions of the above-defined movements $p$ and 21 with a view to obtain a gradual upward movement ("swallowing" milling) or a gradual downward movement (direct milling) of the hob, parallel to the generation of the pinion-tool cone and the taper necessary therefore.

Figures 9, 11, 12, 13, 14, 15, 16:
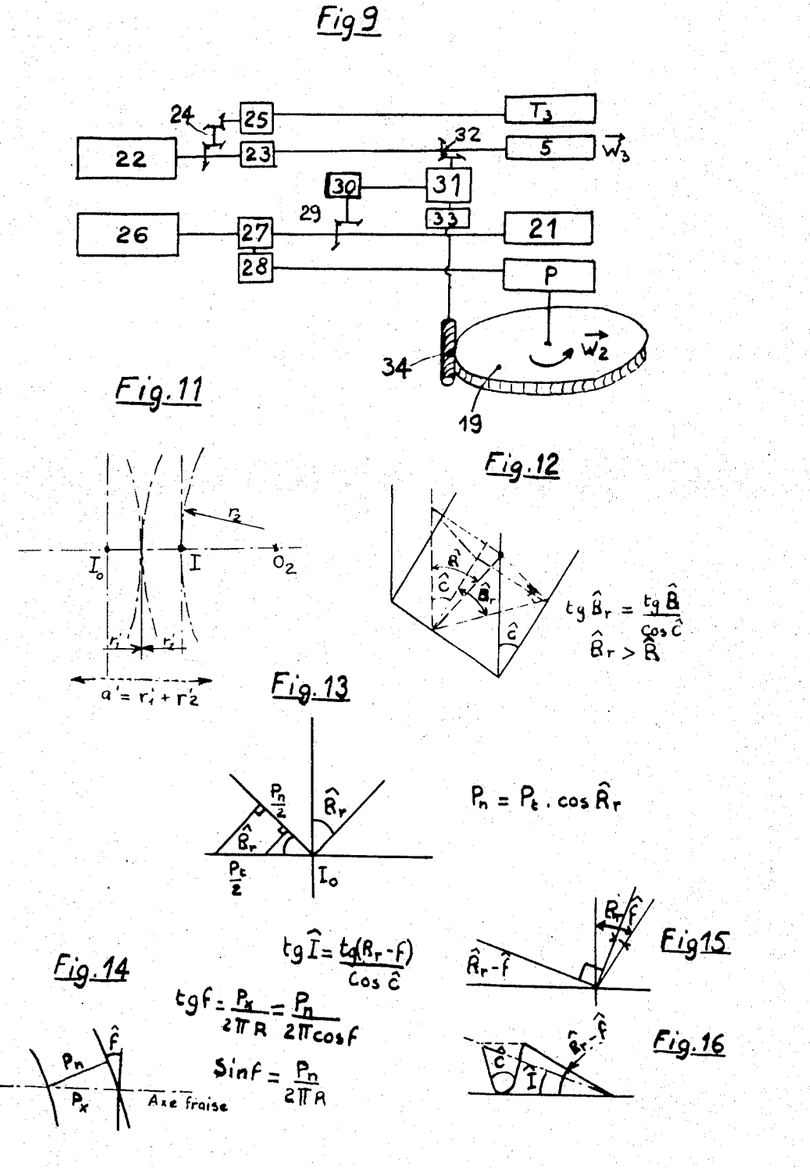
FIG. 9 illustrates a typical example of a kinematic chain for this machine.
FIGS. 11, 12 and 13 illustrate the elements for calculating the normal pitch of the hob.
FIGS. 14, 15 and 16 illustrate the elements for calculating the hob position.

FIG. 9 illustrates a typical example of a kinematic chain of a machine of this character, wherein the main power source or motor 22 produces on the one hand through a reduction gearing 23 the rotational movement $\vec{W_3}$ of the hob and on the other hand through bevel gears 24 and a reduction gearing 25 the axial movement of translation $T_3$ of said hob.

Another motor 26 produces through a reduction gearing 27 the vertical feed 21 of said hob, on the one hand, and through reduction bevel gears 28 coupled to said reduction gearing 27 the radial feed $p$ of the machine table 19.

Through bevel gears 29 disposed at the output end of reduction gearing 27 and a reducing train of gears 30 giving a complementary rotation $\vec{W}$ required for the helical cutting, the motor 26 drives a differential 31. This differential 31 is also driven from motor 22 through bevel gears 32 coupled to the output end of reduction gearing 23.

The differential 31 drives another reduction gearing 33 which, through a worm gearing 34 rotatably drives at a speed $\vec{W_2}$ the table 19 carrying the pinion-tool.

The normal pitch characterizing the hob is calculated at the level of the reference state whereat the angle of the operating helix is that of the skewed surfaced gearing consisting of the hob and the envelope pinion of the reference state.

This permits of finding the angle of inclination of the rack thread inherent to the envelope pinion.

As the hob operates orthogonally to the tangent plane common to the hob-and-kinematic cone reference cylinder, this calculation will also give the angle of inclination of the rack thread obtained by orthogonal projection on the tangent plane (according to FIGS. 11 and 12) as well as the desired normal half-pitch (FIG. 13).

The positioning of the hob reference cylinder is obtained by selecting the radius R (an initial choice depending on the experience acquired with the use of one-thread hobs).

Thus, since it is furthermore desired that the direction of the thread reduces the inclination of the hob axis to the horizontal plane, there is only one possible positioning of the hob according to the angle of inclination of this axis $\hat{I}$ (see FIGS. 14, 15 and 16).

On the other hand, it may be noted that:

to each state of wear of the pinion-tool there corresponds a certain outline of the cutting edge of the hob thread;

the thread shape varies, except for the pitch set at the level of the reference cylinder.

The continuous movement of translation of the hob along its axis which is commonly referred to as the hob shifting, permits the intervention of the various operating faces at a given height, but as far as the state positions are concerned, this can be disregarded.

The velocity of rotation of the hob: $\vec{w_3}$ and the velocity of rotation of the cutting tool: $\vec{w_2} = \vec{w'} + \vec{w_1}$ with $\vec{w'} = (z_1/z_2) \vec{w_1}^1$ ($W' =$ pinion rotation) gives:

$$-w/\vec{w_3} = 1/z^2$$

$\vec{w_1}$ is the differential rotational speed of the pinion-tool, and is calculated at the level of the reference state (which is to remain constant throughout the generation) for the skewed surfaced gearing consisting of the hob and the envelope pinion of the reference state.

$W'$ is subordinate to the axial feed $Vx$.

Finally, $tg\ \hat{C} = Vr/Vx$.

Therefore:

$w_1^1$; $Vr$; $Vx$ mutually interdependent, depend on $\hat{C}$ and on a coefficient $K'$;

$w_3,'w_1'$ mutually interdependent, depend on a coefficient $k2$;

$w2$ depends on the two preceding groups;

$Vx$ is selected, hence $Vr$ (from which the speed $w2$ of the pinion-tool is calculated.)

$w$ is selected, hence $w3$

All these speed values are determined (with the approximation of a multiplying factor).

Then the positions of the reference will be selected at the initial time, i.e. the positions of $hd$ and $hg$ at that time.

Assuming: $(h) \equiv\ =\ =\ \Rightarrow\ (hj)$ translation $(px\ k3)$

Formulas giving $SG.\ Sd$;

We have the subsequent transformations for passing from the reference cylinder related to the hob to the reference cylinder related to the pinion-tool:

Rotation $(\vec{k'}, -\vec{\theta_3})$
Rotation $(i_3\ \gamma\ (\vec{k_3} - \vec{k_2})$
Translation $\vec{F_oO_t} = \vec{F_oO_o} + t(\vec{V_x} + \vec{V_r})$
Rotation $(\vec{k_2}, \vec{\theta_2})$ The current point $Q$ is obtained $$(Sg)Qg\begin{matrix}(xg(\theta, t)\\yg(\theta, t)\\(zg(\theta, t)\end{matrix}$$

$$(Sd)Qd\begin{matrix})xg(\theta, t) + a(t)\\(yg(\theta, t) + b(t)\\)zg(\theta, t) + c(t)\end{matrix}$$

Figure 10:
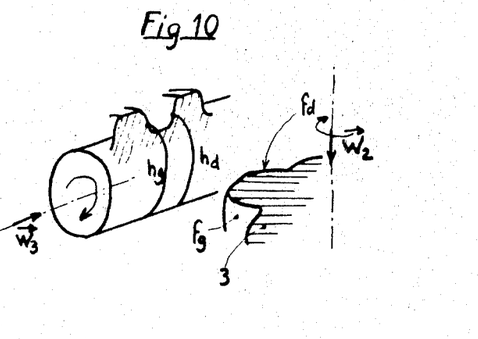
FIG. 10 illustrates the positions of the homologue side faces of the hob and pinion-tool for a given state of wear.
Figure 17:
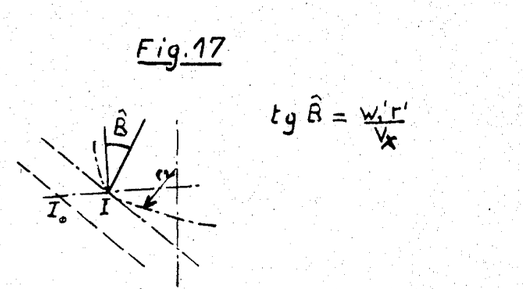
FIGS. 17, 18a, 18b, 18c and 18d illustrate the elements for calculating the differential rotation between the hob and pinion-tool.
Figures 18A, 18B:
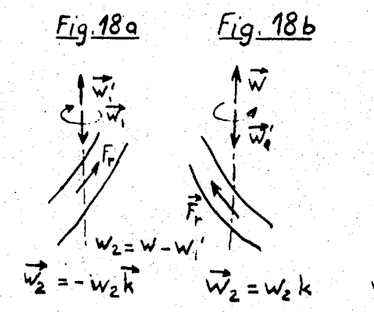
Figures 18C, 18D:
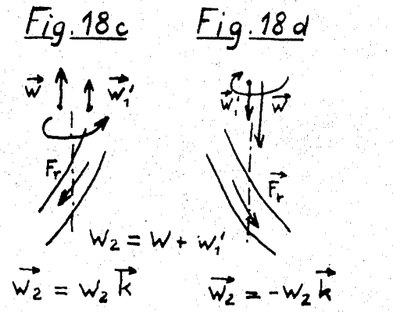

*SG* and *Sd* respectively designate the surfaces of the left-hand and right-hand side faces *fg* and *fd* of a tooth according to FIG. 10. *Qg* designates a current point of the surface *Sg* of the left-hand side face, and *Qd* designates a current point of the right-hand side face.

Formulas giving the plane tangent to the current point of *Sg* and *Sj*:
Plane defined by two tangent vectors $$\overrightarrow{V_{1g}}\begin{pmatrix}xg'_\theta\\yg'_\theta\\zg'_\theta\end{pmatrix}\overrightarrow{V_{2g}}\begin{pmatrix}xg'_t\\yg'_t\\zg'_t\end{pmatrix}$$

(i.e. the derivatives of the coordinates of *Qg* with regard to parameter – and with regard to the parameter *t*).

$$\overrightarrow{V_{1d}}=\overrightarrow{V_{1g}}\quad\overrightarrow{V_{2d}}\begin{pmatrix}xg'_t+a'_t\\yg'_t+b'_t\\zg'_t+c'_t\end{pmatrix}$$

The choice of the variations ranges of $\theta$ and $t$ is subject to a limitation on the angle $\theta$ which leads to limiting the useful portion of *hg* and *hj* and to a limitation on *t*, for it is only sufficient to consider the rotation of one tooth of the tool on a sector.

Then the calculations for determining $\theta' \ldots \theta u\,;\,t' \ldots tu$ of points *Sg*, *Sd*, of their associated tangent vectors, are made.

When the simultaneity condition:
Left-hand side face tangent to *Sg* and right-hand side face tangent to *Sd*, is obtained, this means that there is one point of the left-hand side faces that belongs to *Sg*, such that the tangent to the outline at this point be continuous in the plane tangent to *Sg*, simultaneously with one point of the right hand side face and *Sd*.

Hence the necessity of adding a table of values to the tables of the current points of states of wear, i.e.:

State $j$ $a^1j$ $$P_g i_j \begin{cases} x_{ij} \\ y_{ij} \\ z_{ij} tg_{ij} \end{cases} \longrightarrow \begin{cases} X_i^j \\ Y_i^j \\ Z_i^j \end{cases}$$

$p_g i_j$ indicates a current point having an index *i* and being part of the surface *Sg* for a state of wear *j* of coordinates $x_{ij}, Y_{ij}, z_{ij}$. $tg_{ij}$ indicates a vector associated with the above point $p_g i_j$.

This vector $\vec{t}$ being the vector tangent to the outline, two possibilities are available:
Smoothing the curve: hence the tangent;
Estimation (if the points are close to each other)

$$t_i^j = \left(\frac{\overrightarrow{P(i-1)Pi}+\overrightarrow{PiP(i+1)}}{2}\right)_g$$

Figures 22, 22C:
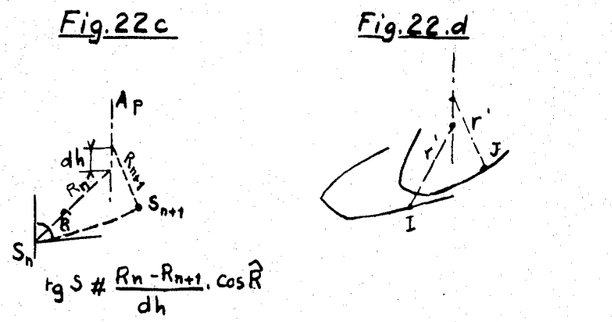
Figure 22A:
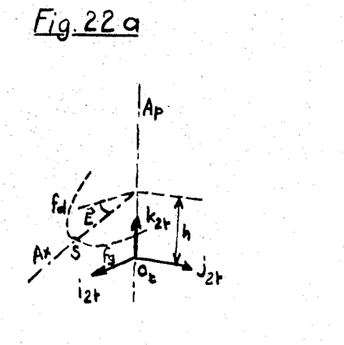

As the positioning of the outline depends on two parameters (translation and rotation through an angle $\hat{E}$) the outline is defined as a function of these parameters in the reference marks connected to the pinion-tool according to FIG. 22a in which we have for the left-hand side face:

$$t_{gi}\begin{cases}x_{gi}\,(\hat{E})\\y_{gi}\,(E)\\z_{gi}\,(h)\end{cases}\quad P_{gi}\begin{cases}x_{gi}\,(E)\\y_{gi}\,(E)\\z_{gi}\,(h)\end{cases}$$

and for the right-hand side face:

$$P_{di}\begin{cases}x_{di}\,(\hat{E})\\y_{di}\,(E)\\z_{di}\,(h)\end{cases}\text{ and }t_{di}\begin{cases}x_{di}\,(\hat{E})\\y_{di}\,(E)\\z_{di}\,(h)\end{cases}$$

Figure 22B:
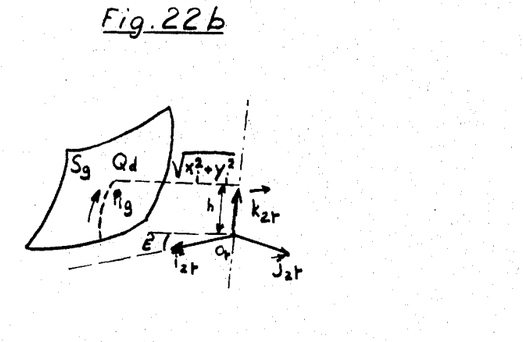
Figure 23:
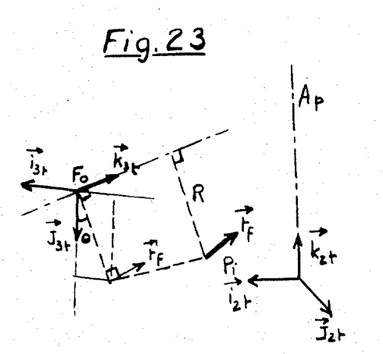
FIG. 23 shows the calculation parameters concerning the hob.
Figure 24:
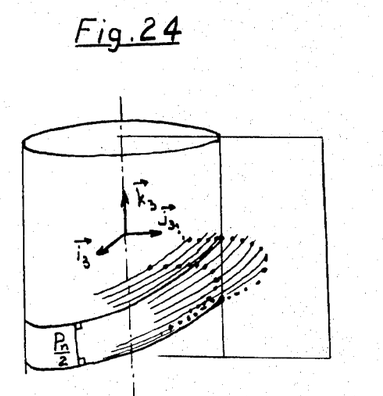
FIG. 24 illustrates diagrammatically the method of determining the outline from points on the hob thread.

Thus the following iterations may be made according to the procedure given hereinafter:

Determining the coincidence of $P_{ig}^j$ with $Q_g$ ($P_{ig}^j$ being already selected), i.e. determining $\hat{E}$ (FIG. 22*b*) in which, with the preferential system $(O_i;\,i_2t,\,j_2t,\,k_2t)$ we have:

$$P_g^i\begin{cases}\sqrt{x_{gi}^2+y_{gi}^2}\cdot\cos\hat{E}\\\sqrt{x_{gi}^2+y_{gi}^2}\cdot\sin\hat{E}\\Z_{gi}+h\end{cases}$$

In this case are $\overrightarrow{tig},\overrightarrow{V1Q},\overrightarrow{V2Q}$ coplanar?
Be $\overrightarrow{tig}\cdot(\overrightarrow{V1Qg}\wedge\overrightarrow{V2Qg})\neq O$;

If yes, the operation is directed to the right-hand side face, if the answer is negative, the operation is resumed with another $P_{ig}^j$.

Passage to right-hand side face:
A coincidence between a *Pij* and a *Qj* with $tig\,(V1Qj\wedge V2Qj)\neq 0$. must exist; if the answer is yes, the positioning of *h* and *j* is satisfactory, and if it is no, *h* must be changed and the operation is resumed at the first iteration until the two groups of requirements are met.

Then the other states are considered with the same groups of iterations.

It may be noted that for each state ranges of variation of parameters $\theta$ and $t$ must be selected.

Then the intermediate checkings will be made before positioning all the states; it will be well to set the (estimated) values of the clearances before having positioned, say, two states.

It will be seen that the nearer the states, the more the estimated values approach the theoretical ones (FIG. 22*c*).

A comparison between the estimated values and the values admitted for the machining operation will be necessary.

If the values thus found are inadequate or inadmissible, the angle of the kinematic cone of the second portion will be changed; therefore the calculation concerning the positioning of the states of wear of the pinion-tool shall be resumed.

When all the states have been properly positioned, the useful height of the pinion-tool ($hu-hn$) will be obtained Thus, according to FIG. 22c wherein $Sn$ denotes the apex of state $n$ and $Sn+1$ the apex of state $n+1$, we have :

$$tg\hat{S} \# [(Rn - Rn+1)\cdot \cos \hat{B}/dh]$$

In FIG. 22d, for the point $I$ on the circle of operation between workpiece and pinion-tool, we have $tg\hat{B} = (2\pi r^1/Px)$, $\vec{I_t}$ being the vector tangent to the helix of angle $B'$ and $$\cos \hat{B} \# 1 - \frac{E^2}{2} \# \frac{\vec{Ij}\cdot\vec{It}}{|Ij||It|},$$

from which the lateral clearance angle $\hat{E}$ can be checked.

Then a third section concerning the calculation of the theoretical hob 4 (FIG. 1) is dealt with as a function of the previously acquired data.

These data relate to :
1. the pinion-tool : in a reference related to the tool, from the worn state to the new state, $n$ states are positioned. These states are defined by points : one point per side face and per state admits a conjugate on the homologue helix of the side face, said helix pertaining to the reference cylinder of the hob, the two helices corresponding to each side face being spaced by half the normal pitch.
2. the hob of which we know :
   one thread,
   the inclination $\hat{I}$,
   the radius of the reference cylinder $R$,
   the thread helix on this cylinder, which helix is spaced by $Pn/2$.
3. the kinematic elements :
   of the kinematic pinion-tool cone,
   of the hob reference cylinder rolling on this cone,
   the rotational speed $\vec{w2}$, $\vec{w3}$ and the velocity of translation $\vec{Vr}$, $\vec{Vx}$.

The calculation method to be adhered to is described hereinafter :

From an initially known outline corresponding to a given state of wear, the problem consists in finding on the hob the conjugates of each point of the outline of the pinion tool.

Thus, at the conjugation, a point $P$ and its conjugate point $P$ are in mutual contact :
$P$ has an absolute speed in relation to the tool reference $\vec{Va2}$
$P$ has an absolute speed in relation to the hob reference $\vec{Va3}$ At this conjugation :

$$\vec{Vg} = \vec{Va3} = \vec{Va2}$$

$\vec{Vg}$, $\vec{Va3}$, $\vec{Va2}$ lie in the tangent plane common to both sets of teeth at this point :

Or alternately :

At the conjugation, the plane tangent to the point involved at the tool teeth contains the tangent to the hob thread helix which passes through this conjugation point.

Therefore, the relationships meeting these requirements must be determined.

Thus, for each point of the outline, we can find the conjugate related to the hob and therefore the helix of the thread passing through this point.

Thus the thread is formed by a series of helices and this permits the determination of :
 the rack outline,
 the outline of the leading face of the hob.

In the simplest intermediate reference (FIG. 20) the sliding speed at any time will be calculated.

Figures 19, 20, 21:
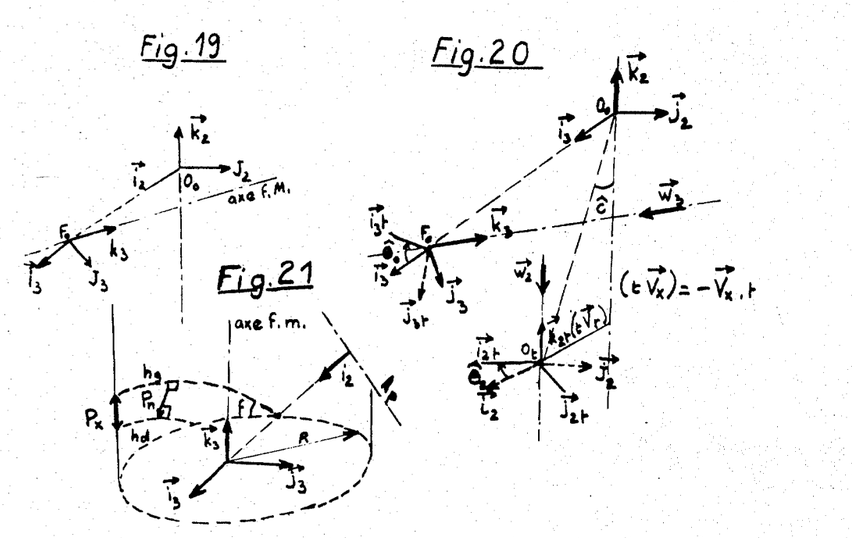
FIGS. 19 and 20 show the elements for calculating the relative positions of the pinion-tool and hob at a moment O and at a moment $t$.
FIG. 21 illustrates the position parameters of the homologue helices of the right-hand and left-hand side faces.

By utilizing this FIG. 20 and the conversion formulas for passing from the preferential related to the hob to that related to the pinion-tool from an initial point $Pi$, we have:

$$\vec{Va} = \vec{w3} \wedge \overrightarrow{F_oPi} + \vec{Vx}$$
$$\vec{V2} = \vec{w2} \wedge \overrightarrow{O_tPi} + \vec{Vr}$$

At the conjugation:

$$\vec{Vg} = (\vec{w3} \wedge \overrightarrow{F_oPi} + \vec{Vx} - \vec{w2} \wedge \overrightarrow{O_tPi} = \vec{Vr})$$

The tangent to the outline at point $Pi$ is related to the pinion-tool as in the reference.

$$\vec{ti}\begin{cases}Xi\\Yi\\Zi\end{cases}$$

It is necessary to know the tangent characterizing the helices of the hob threads.

The axial pitch of the hob, $Px$, is already known ; therefore, given any cylinder radius the angle of the corresponding helix is also known : $tg\, b = (Px/2\pi R)$ Hence the knowledge of the necessary vector $tf$ in the reference related to the hob as a function of two parameters : $R$ and $\theta$ depending on $\overrightarrow{F_oPi}$. with $\cos \theta = F_oPi_{xt}/F_oP_i$ and $$R = \sqrt{(\overrightarrow{F_oPi}\cdot\vec{i_{xt}})^2 + (\overrightarrow{F_oPi}\cdot\vec{j_{xt}})^2} \sin \theta = \epsilon\sqrt{1-\cos^2\theta}$$

In the reference related related to the hob :

$$\vec{tf}\begin{cases}\cos f \cdot \cos \theta\\ \cos f \cdot \sin \theta\\ \sin f\end{cases}$$

The conjugation will be obtained when $\vec{ti}$, $\vec{tf}$, $\vec{Vg}$ are coplanar
that is :

$$\vec{ti}\cdot(\vec{ti} \wedge \vec{vg}) \# 0$$

At each moment t, as $\vec{tf}$, $\vec{ti}$, $\vec{vg}$ are known as a function of $t$, the conjugation is obtained when the preceding relationship is obtained.

The time $t$ proving the condition gives the position of $P^1i$ conjugate in the reference related to the hob.

Therefore, for each point $P_i'$ of the outline of a state $j$, an iteration is achieved on time for finding the conjugate $P^1_i{}'$ o on hob thread.

These points $P^1_i{}'$ must be marked on the reference element related to the hob.

In the calculation of the hob thread outline for each state $i$, each state $j$ corresponds to a certain number of points $P^1_i{}'$ and therefore of helix passing through these points determining the thread.

Since what we are concerned with is the rack outline, it is only necessary, for finding the outline, to seek the intersection points of the preceding helices with an axial plane. Thus, the rack of the given hob is obtained through a sequence of outlines corresponding to successive states of wear, and also the rack calculated theoretically with the only compulsory requirement to have a constant normal half-pitch on the plane tangent to the hob reference cylinder.

According to the results of these calculations and from the thus defined theoretical hob 4, it will be possible to obtain a so-called simplified hob 5 which will be as close as possible to the theoretical hob, with due consideration for the possibilities of making such tool means. This machining operation will advantageously be carried out by means of a program based on the above-disclosed calculations and applied to a digit-controlled milling machine.

Then the so-called simplified pinion-tool 6 resulting from the simplified hob 5 will be cut by milling, and after sharpening according to the procedure described hereinafter, the resultant pinion 7 will eventually be cut in turn.

Now the outlines of the resultant pinion 7 must be determined.

This results in a comparison between the initial pinion outline and the outlines cut by the different states of wear of the pinion-tool due to the simplified hob.

To be acceptable, the resultant pinion must have resultant teeth differences within the tolerances contemplated.

Figure 25:
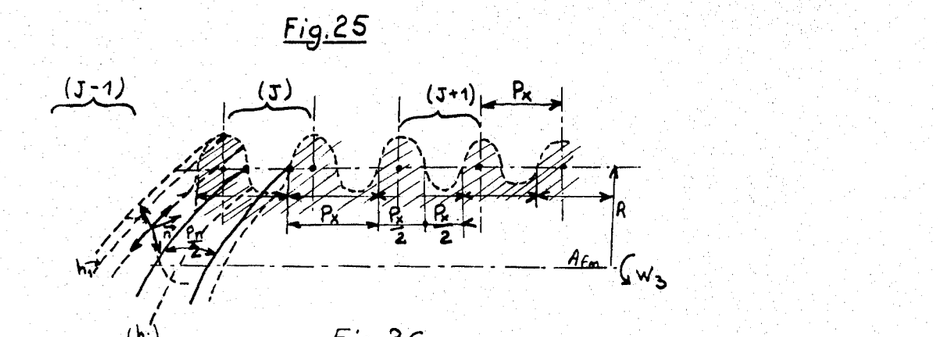
FIG. 25 is a diagrammatic illustration of its axial outline.

This simplified real outline may be calculated on the following bases:

To a hob thread outline of the plane there corresponds a hob thread of constant outline (FIG. 25).

During the kinematic movement, for a series of successive times, there corresponds a sequence of traces of this thread in the plane of the leading face of the tool contemplated.

The outline of the tool leading face is the envelope of these traces. There are two possibilities of finding this point of contact between trace and envelope.

Figure 26:
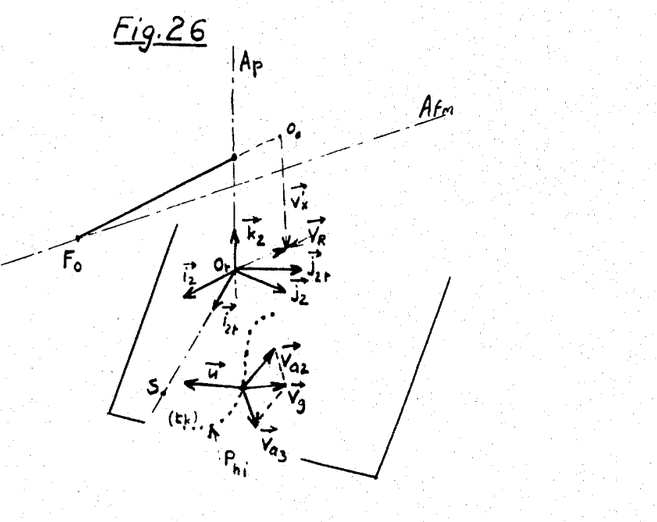

With each point of a trace there is associated a normal of the hob thread of the corresponding point (FIG. 26):

this normal must, at the conjugation, lie in the plane containing the point and the turning axis of moment $t$.

or at the conjugation, the sliding speed must lie within the plane tangent to the thread: $\vec{n} \cdot \vec{vg} = 0$.

By repeating this calculation for each trace of said plane, we can obtain the outline of the cutting edge of a given state of wear.

In FIG. 26 showing the parameters of the conjugation of moment $tk$, S is the top of the previously calculated apparent outline having permitted of positioning the real plane of the leading face in state $j$ (FIG. 3c). The points Phi represent the helix traces $i$ at said moment tk in the real plane. $Af_m$ is the hob axis.

Associated with the rear cutting edge outline of one state of wear is an envelope cylinder of which the apparent outline must be determined and of which the center distance with the pinion (under service conditions) is already known (since it is a state of wear $j$).

Thus, by resorting to a generation calculation (pinion-pinion) already utilized in the preceding phase, the outline of the pinion-teeth for a state $j$ is obtained with the following data:

apparent outline (in an axial plane) of a one-thread hob;

the successive thread outlines are spaced by one axial pitch $Px$ on the reference cylinder of the cylinder hob having a radius $R$;

kinematic data identical with the previously determined ones:

velocity of rotation, velocity of translation, position at the initial moment of the hob, of the pinion-tool axis, and therefore of the two helices of the reference cylinder which are constantly spaced $Pn/2$ along the entire thread length (as contrasted to the case of the thread curves carried by a cylinder having a radius other than $R$).

In a reference construction related to the tool axis, we also know the position of the leading faces of one tooth for a series of states of wear given by the previously calculated couples $(k, \hat{E})$.

Now each one of these faces (in a plane) corresponds to a certain modified thread outline.

The calculation of the real outlines of the pinion-tool will lead to the following stages:

Formulation of geometrical elements:

Formulation giving the helices of the different points of the thread outline corresponding to a state $j$.

Readjustment of the ranges of variation in the calculation parameters $\theta$ and $t$ for the state $j$ (see the positioning of the states of wear).

Formulas giving the plane of the tool leading face in state $j$.

Determination of the real outline of the conjugate tool:

in the simplest reference cylinder, in the hob/tool kinematic movement, for each moment of the series $(\vec{t_1} = \vec{tk} = \vec{tn})$ Group of operations to be carried out: at a moment tk the thread helices being ordinates from 1 to $p$:

traces of the helix ($i$) on the plane of the tool leading face coordinates.

components of the associated normal vector $\vec{n}$ (normal to the thread at this point and at this moment).

components of $\vec{vg}$ (second method) according to the formula:

$$\vec{v} = \vec{va}3 - \vec{va}2 \ (=\vec{vg} \text{ at the conjugation})$$

application of the conjugation relationship:

$$\vec{n} \cdot \vec{vg} \neq 0$$

If the relationship is obtained, we have the point, otherwise another helix ($i+1$) must be contemplated.

Having thus obtained the conjugate at moment $tk$, the series of operations are resumed with moment $tk + 1$.

Thus, a real outline of the tool leading face through a double iteration for the state $j$ is obtained:

$$t1 \ldots tk \ldots tn$$

with helices $h1 \ldots hi$.

The calculations are repeated for the other j states. Then the apparent outline of the envelope cylinder will be calculated.

For a state j we know the center distance of the pinion and pinion-tool $a^i j$ during their actual operation. The envelope cylinder of state j has an axial pitch $Pxj$: hence, the cylindrical helices of the tooth of the envelope cylinder and their intersection with an apparent plane perpendicular to the tool axis.

We obtain by points the apparent outline of the envelope cylinder.

Regarding the resultant pinion, we shall have for each state j of the tool to calculate by points the pinion tooth outline generated by the apparent outline of the envelope cylinder of state j.

with the center distance $a^1 j = r^1 1 j + r^1 2 j$, and the teeth number $z1, z2$, then make a comparison with the initial pinion by taking, for the choice of the points to be compared, for example those located on the active top outer circle, the bottom circle and the nominal pitch circle.

As a consequence of checkings made between the initial outline and the outline j, if the differences lie outside the permissible tolerances it will be necessary to revert to the modified hob outline, revise the simplification and resume all the calculations concerning the j state involved.

The cutting of the resultant workpieces 7 by means of the rough-milled pinion-tool 6 will necessitate of course a sharpening of the leading face of the teeth of this tool.

Figures 27, 28, 29, 30, 31, 32:
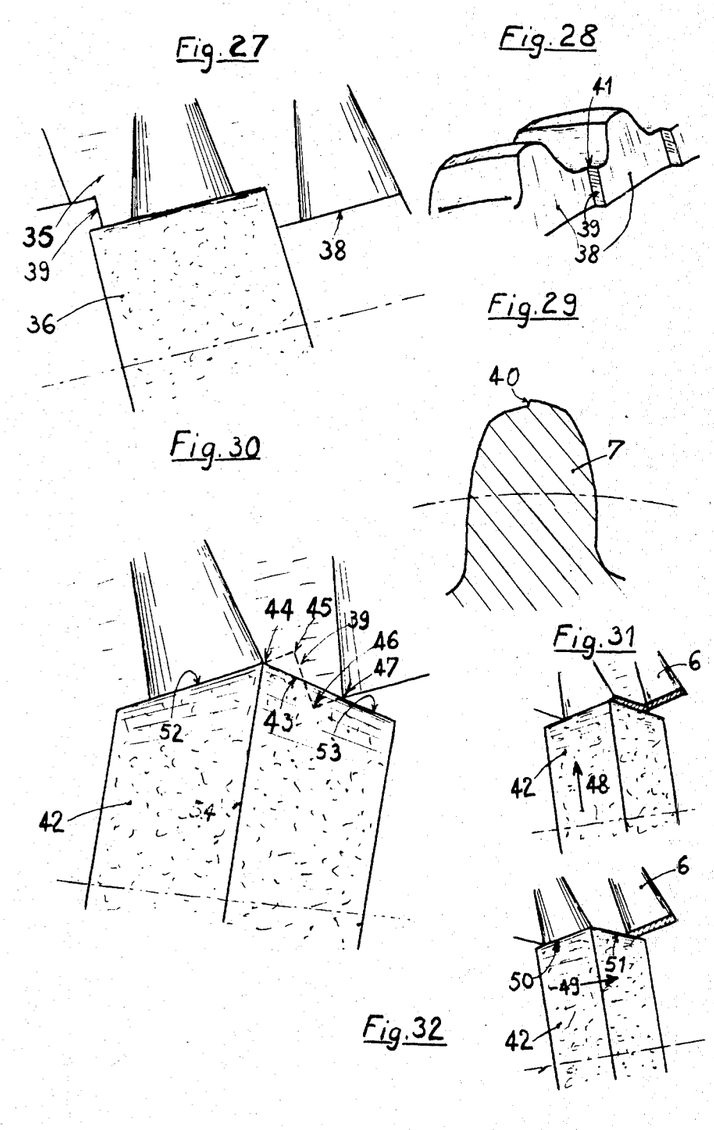
FIG. 27 shows the conventional sharpening operation applied to a pinion-tool by using a cylindrical hob or miller.
FIGS. 28 and 29 illustrate the "steps" thus formed on the teeth of the pinion-tool and workpiece.
FIG. 30 shows the sharpening operation carried out according to the method of this invention.
FIGS. 31 and 32 show by way of example two stages of the sharpening operation.

FIG. 27 shows the sharpening procedure now currently used for these faces in the case of a pinion-tool 35 of known type. The use of a cylindrical grinding wheel 36 produces successive leading faces 38 (FIG. 28) connected through a shoulder 39 and forming a step 40 at the top of the teeth (FIG. 29), during the cutting operation, due to the corresponding step 41 formed at the bottom of the teeth of the pinion-tool.

FIG. 30 shows the sharpening method of this invention wherein the grinding wheel 42 is cut to constitute a double frustum of a cone, wherein the frustums are assembled by their major bases, and an outline as shown in this FIG. 30. As a result, the edge of the tooth bottom of pinion-tool 6, instead of forming a broken line 44, 45, 46, 47 has a straight line contour 43, 47, thus eliminating the resultant surface steps or shoulders 40, 41 on workpiece 7 and pinion-tool 6. FIG. 31 shows a first phase of the sharpening operation, wherein the grinding wheel is fed with a forward movement 48 followed (FIG. 32) by a lateral translation 49 parallel to the leading face 50.

One of the tapered side faces 52 of the grinding wheel operates tangentially to the leading face 38 of a tooth, the other tapered side face 53 of the grinding wheel constituting a continuous connecting face with the leading face of the adjacent tooth, across the width of the tooth bottom area.

The central circular edge or ridge 54 of the grinding wheel is coincident with a radius of the pinion-tool containing the apex 44 of one of the edge angles in the bottom of a tooth.

The tooth bottom edge 51 of pinion-tool 6 may be utilized directly for cutting the tops of the teeth of the workpiece pinions 7 according to the "integral" cutting process of this invention.

Without further analysis, the foregoing will so fully reveal the gist of the present invention that others can by applying current knowledge readily adapt it for the various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new is:

1. A method of integrally cutting gear teeth using pinion-tools comprising:

calculating, from the outline of a desired gear and its generating rack, an apparent outline, which is the outline projected onto a plane perpendicular to the axis of the pinion-tool, of a theoretical pinion-tool for different states of wear of said tool, calculating, from the teeth surfaces of said theoretical pinion-tool, a theoretical hob which generates said surfaces, providing a physical embodiment of said theoretical hob which embodiment is a simplified hob, milling a simplified pinion-tool from the simplified hob, and sharpening the leading faces of said tool, producing a rough-cut gear using said simplified pinion-tool, comparing the outline of said rough-cut gear with the outline of the desired gear, and after comparing said outlines, correcting the simplified hob to more nearly correspond to the theoretical hob, correcting the simplified pinion-tool t correspond to the corrected hob, and producing a desired gear with the corrected pinion-tool.

2. Method of cutting gear teeth according to claim 1, wherein the cutting edge outlines and the center distances of the pinion-tool are calculated to obtain a constant resultant teeth outline in the workpiece, including the teeth top outline and the teeth bottom outline, as a function of parameters of said outline, for the complete range of states of wear of said pinion-tool.

3. Method of cutting gear teeth according to claim 1, wherein the thread of an equivalent pinion, which is equivalent to the tool for a certain state of degree of wear and is characterized by its helix angle on the operating cylinder generated on the tool, bears on the apparent outline corresponding to each state of wear of the pinion-tool, said outline admitting an axis of symmetry for each tooth.

4. Method of cutting gear teeth according to claim 3 wherein, for each state of wear of the pinion-tool, there is for each tooth an intermediate outline, intersection of the thread, called the cylindrical thread, with a plane cutting the plane of the apparent outline along the axis of symmetry of said outline with an angle equivalent to the helix angle of the apparent outline.

5. Method of cutting gear teeth according to claim 4, wherein the final real outline of each tooth, for each state of wear of the pinion-tool, consists of the intersection of the thread with a plane forming a sharpening angle with the plane of the intermediate outline, the helix angle of the operating cylinder on this intermediate outline having a different value for each sharpening state.

6. Method of cutting gear teeth according to claim 5, wherein the useful height of the pinion-tool is obtained by the iteration calculation of the positions of the outlines corresponding to the successive states of wear of said pinion-tool.

7. Method of cutting gear teeth according to claim 1, wherein the outline of the rack for milling the theoretical hob is variable at each pitch and obtained from the sequence of outlines corresponding to the successive states of wear of the theoretical pinion-tool, said hob having a constant normal half-pitch in the plane tangent to the reference cylinder of the hob on the straight line of equal division of said rack.

8. Method of cutting gear teeth according to claim 7, wherein the skewed surfaced gearing consisting of the theoretical hob and the envelope of the pinion of the reference state has a constant differential rotational speed along its generation.

9. Method of cutting gear teeth according to claim 8, wherein the pinion-tool is milled by means of the simplified hob through a combination of axial feed and rotational movements of said hob, of rotational movements of a table carrying the pinion-tool, with radial feed movements of the table carrying the pinion-tool and a continuous axial translation of said hob along its axis.

10. Method of cutting gear teeth according to claim 9, wherein a machine for cutting the pinion-tools by means of a hob is driven from a motor adapted to produce through the medium of a reduction gearing the continuous axial translation of said hob as well as the rotation of said hob through the medium of another reduction gearing, another motor controlling the vertical feed of said hob on the one hand and on the other hand, through the medium of bevel gears and reduction gearings, the longitudinal feed of said table, the rotation of said table being controlled by means of a further reduction gearing and a differential train of gears driven through kinematic chain means respectively from the movement of rotation of said hob and through other kinematic means from the feed movement of said hob.

11. A method of integrally cutting gear teeth using pinion-tools comprising:

calculating, from the outline of a desired gear and its generating rack, an apparent outline, which is the outline projected onto a plane perpendicular to the axis of the pinion-tool, of a theoretical pinion-tool for different states of wear of said tool, calculating, from the teeth surfaces of said theoretical pinion-tool, a theoretical hob which generates said surfaces, providing a physical embodiment of said theoretical hob which embodiment is a simplified hob, milling a simplified pinion-tool from the simplified hob, and sharpening the leading faces of said tool, producing a rough-cut gear using said simplified pinion-tool, and comparing the outline of said rough-cut gear with the outline of the desired gear or establishing a basis for correction of the simplified hob for subsequent correction of the pinion tool outline and the cut gear.

* * * * *

UNITED STATES PATENT OFFICE
CERTIFICATE OF CORRECTION

Patent No. __3,720,989__  Dated __March 20, 1973__

Inventor(s) __Pierre A. RAMOND__

It is certified that error appears in the above-identified patent and that said Letters Patent are hereby corrected as shown below:

Applicant claims priority as follows:

-- FOREIGN PRIORITY DATA

June 16, 1969    FRANCE    No. 69/19.904  --

Signed and sealed this 29th day of October 1974.

(SEAL)
Attest:

McCOY M. GIBSON JR.
Attesting Officer

C. MARSHALL DANN
Commissioner of Patents